UNITED STATES PATENT OFFICE.

WALTER LEVERSIDGE, OF DORCHESTER, MASSACHUSETTS.

COMPOSITION OF MATTER TO BE USED AS A SUBSTITUTE FOR GUM-SENEGAL IN CALICO-PRINTING.

Specification forming part of Letters Patent No. 344, dated May 30, 1837.

*To all whom it may concern:*

Be it known that I, WALTER LEVERSIDGE, of Dorchester, in the county of Norfolk and State of Massachusetts, have invented certain new and useful materials, prepared by a process herein described, and also a new and useful composition of matter to be used as a substitute for gum-senegal and other articles of a similar nature employed in calico-printing, which composition of matter, when prepared for the calico-printer, I denominate "Factitious Gum-Senegal Powder;" and I do hereby declare that the following is a full and exact description of the mode of compounding and preparing the same, and also of preparing a substitute for gum-senegal from certain of the individual materials used in making the compound.

The composition consists of sago, potato-starch, and lime, which may be combined together in variable proportions; but the best mixture is made in the following relative quantities, or nearly so: I take forty parts of sago, fifty-five parts of potato-starch, and five parts of quicklime, which ingredients I mix together and reduce the whole to a fine powder. I then put this powder into an open vessel and expose it to a temperature not exceeding 220° of Fahrenheit's thermometer, keeping it at this temperature until it has parted with all the water which it will lose at that degree of heat, and until the mass has become slightly discolored. To insure an equal action of the fire upon the mass the vessel must be so constructed as that its contents may be stirred or agitated during the process of desiccation. The vessel is then to be closed, leaving only a small aperture through which the acid and other vapors may escape, and through which the powder may be examined by the aid of a small spatula, to ascertain the progress of the operation. The heat is to be gradually raised until it approaches a temperature of 620°, this part of the operation requiring from three and one-half to four hours, or a length of time sufficient to produce the proper color, which is a dark orange-brown. The vessel is then to be uncovered and the contents mixed intimately by stirring. It is then to be closed and a stopper put into the small hole left for the escape of the vapors, and the heat continued as before, but not increased in any sensible degree. A reaction of the materials now takes place, the mass becomes somewhat adhesive, and exhibits an appearance of partial fusion. This is ascertained by occasionally removing the stopper and inserting the spatula, when a portion of the mass will adhere to it. It is now to be removed from the fire, spread out thinly on a floor, stirring and turning it until it becomes cool. After this it is again ground and passed through a fine sieve or bolting-cloth. The material is then ready for the calico-printer, and is used for the same purposes and in the same way as the native gum-senegal.

I sometimes use the potato-starch without the admixture of sago or of lime, and I likewise sometimes employ the sago alone, treating them in the same way with the above-named compound, and by this means produce a material which, although not equally good for all purposes as a substitute for gum-senegal, will answer in some cases, and has not, to the best of my knowledge and belief, been heretofore applied to this purpose.

What I claim as my invention, and wish to secure by Letters Patent, is—

1. The preparing a substitute for gum-senegal or other gums of a similar nature by the calcination or roasting of a compound of sago, potato-starch, and quicklime, either in the proportions designated or in any other proportions by which a substance substantially the same is obtained.

2. The preparing of a substitute for gum-senegal or other gums of a similar nature in some respects analogous to the foregoing compound, by the calcination or roasting of either sago or potato-starch alone or in variable proportions, with or without the addition of lime.

WALTER LEVERSIDGE.

Witnesses:
THOS. P. JONES,
CLEMENT F. COOTE.